(12) United States Patent
Matsumoto

(10) Patent No.: US 10,807,333 B2
(45) Date of Patent: Oct. 20, 2020

(54) TIRE MOLD AND PNEUMATIC TIRE

(71) Applicant: The Yokohama Rubber Co., LTD., Minato-ku, Tokyo (JP)

(72) Inventor: Kenichi Matsumoto, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 577 days.

(21) Appl. No.: 15/548,758

(22) PCT Filed: Feb. 4, 2016

(86) PCT No.: PCT/JP2016/053405
§ 371 (c)(1),
(2) Date: Aug. 3, 2017

(87) PCT Pub. No.: WO2016/125868
PCT Pub. Date: Aug. 11, 2016

(65) Prior Publication Data
US 2018/0022047 A1    Jan. 25, 2018

(30) Foreign Application Priority Data
Feb. 4, 2015   (JP) .................. 2015-019994

(51) Int. Cl.
*B29D 30/06*    (2006.01)
*B60C 11/16*    (2006.01)
(Continued)

(52) U.S. Cl.
CPC .......... *B29D 30/0606* (2013.01); *B29C 33/02* (2013.01); *B29C 35/02* (2013.01);
(Continued)

(58) Field of Classification Search
CPC ............ B29D 30/0606; B29D 30/0629; B29D 30/66; B29D 2030/0612; B29D 2030/662
See application file for complete search history.

(56) References Cited

U.S. PATENT DOCUMENTS 7,338,571 B2 * 3/2008 Brivio .................... B29D 30/66
152/210
9,346,229 B2 * 5/2016 Cocural ............. B29D 30/0606
(Continued)

FOREIGN PATENT DOCUMENTS

EP          2 202 096       6/2010
JP          2012-096471     5/2012
(Continued)

OTHER PUBLICATIONS

Machine translation of JP2013-067192 (no date).*
(Continued)

*Primary Examiner* — James P Mackey
(74) *Attorney, Agent, or Firm* — Thorpe North & Western

(57) ABSTRACT

A tire mold comprises sector molds for forming a tread portion of a tire and mold pins provided on the sector molds for forming insertion holes in the tread portion. The insertion holes each comprise a first hole portion with a first inner diameter where a body portion of a stud pin is disposed and a second hole portion with a second inner diameter greater than the first inner diameter where a bottom flange portion of the stud pin is disposed. The mold pins each comprise a trunk portion with a first outer diameter for forming the first hole portion and a tip portion with a second outer diameter greater than the first outer diameter for forming the second hole portion.

9 Claims, 11 Drawing Sheets

(51) Int. Cl.
  *B29C 35/02*  (2006.01)
  *B29C 33/02*  (2006.01)
  *B29D 30/66*  (2006.01)
(52) U.S. Cl.
  CPC .......... *B60C 11/16* (2013.01); *B60C 11/1625* (2013.01); *B60C 11/1656* (2013.01); *B60C 11/1668* (2013.01); *B29D 30/0629* (2013.01); *B29D 2030/0612* (2013.01); *B29D 2030/662* (2013.01)

(56) References Cited

U.S. PATENT DOCUMENTS

| | | | |
|---|---|---|---|
| 9,724,885 B2* | 8/2017 | Abe | ............... B29D 30/0606 |
| 2016/0159164 A1 | 6/2016 | Matsumoto | |

FOREIGN PATENT DOCUMENTS

| | | | | |
|---|---|---|---|---|
| JP | 2012096471 A | * | 5/2012 | ............. B29D 30/00 |
| JP | 2013-067192 | | 4/2013 | |
| JP | 2013067192 A | * | 4/2013 | ......... B60C 11/1675 |
| JP | 5513345 | | 6/2014 | |
| JP | 2014-128886 | | 7/2014 | |
| WO | WO 2014/103422 | | 7/2014 | |
| WO | WO 2015/012070 | | 1/2015 | |

OTHER PUBLICATIONS

Machine translation of JP2012-096471 (no date).*
International Search Report for International Application No. PCT/JP2016/053405 dated Mar. 22, 2016, 3 pages, Japan.

* cited by examiner

|  | CONVENTIONAL EXAMPLE | EXAMPLE 1 | EXAMPLE 2 | EXAMPLE 3 |
| --- | --- | --- | --- | --- |
| FIRST OUTER DIAMETER OF TRUNK PORTION | NO CHANGE | +0.3 mm | +0.3 mm | +0.3 mm |
| SECOND OUTER DIAMETER OF TIP PORTION | NO CHANGE | NO CHANGE | -0.5 mm | -0.5 mm |
| LENGTH OF MOLD PIN | NO CHANGE | NO CHANGE | NO CHANGE | -0.2 mm |
| NUMBER OF CRACKS | 30 | 10 | 7 | 3 |

FIG. 12

TIRE MOLD AND PNEUMATIC TIRE

TECHNICAL FIELD

The present technology relates to a tire mold and a pneumatic tire.

BACKGROUND ART

Known winter tires include studded tires that include stud pins. Stud pins are inserted in insertion holes provided in the tread portion of the tire. Japanese Patent No. 5513345B describes a studded tire manufactured via the steps including vulcanizing a green tire in a mold that includes projection portions that include mold pins, removing the vulcanized tire from the mold, and inserting the stud pins into the insertion holes formed in the tire by the projection portions. The mold includes a plurality of sector molds that form the tread portion of the tire and side molds that form the sidewall portions of the tire. The projection portions for forming the insertion holes are provided on sector molds.

SUMMARY

After vulcanization of a tire, cracks can form in the region around the insertion holes, caused when the projection portions are removed from the insertion holes. Such cracks can cause the holding force that holds the stud pins in the insertion holes to be decreased, spoil the appearance of the tire, and cause the performance of the studded tire to be decreased.

An aspect of the present technology has an object of providing a tire mold and a pneumatic tire capable of suppressing cracking when forming insertion holes.

A first aspect of the present technology provides a tire mold for forming a tire that includes insertion holes into which stud pins are inserted, the tire mold comprising:

a plurality of sector molds for forming a tread portion of the tire, the plurality of sector molds being disposed in a tire circumferential direction; and a plurality of mold pins for forming the insertion holes in the tread portion, the plurality of mold pins being provided on inner surfaces of the plurality of sector molds that oppose the tread portion and projecting inward in a tire radial direction;

the stud pins each comprising a body portion and a bottom flange portion;

the insertion holes each comprising a first hole portion with a first inner diameter where the body portion of the stud pin is disposed and a second hole portion with a second inner diameter greater than the first inner diameter where the bottom flange portion of the stud pin is disposed;

the plurality of mold pins each comprising a trunk portion with a first outer diameter for forming the first hole portion and a tip portion with a second outer diameter greater than the first outer diameter for forming the second hole portion; and the first outer diameter of the trunk portion of an end mold pin of the plurality of mold pins provided in an end region in the tire circumferential direction of each of the plurality of sector molds being greater than the first outer diameter of the trunk portion of a middle mold pin of the plurality of mold pins provided in a middle region of each of the plurality of sector molds, the middle region being located between the end region on one side and the end region on the other side in the tire circumferential direction.

According to the first aspect of the present technology, the first outer diameter of the end mold pin is greater than the first outer diameter of the middle mold pin. As a result, when the sector molds are moved outward in the tire radial direction to release the tire and the end mold pins are removed from the insertion holes formed in the tire, cracking caused by removal of the end mold pins is suppressed.

The angle formed by the movement axis of the sector mold and the center axis of the middle mold pin is small when the sector molds are moved outward in the tire radial direction. The angle formed by the movement axis of the sector mold and the center axis of the end mold pin is large.

The first outer diameter of the trunk portion of the mold pin being small includes in its meaning the difference between the first outer diameter of the trunk portion of the mold pin and the second outer diameter of the tip portion of the mold pin being great. The first outer diameter of the trunk portion of the mold pin being large includes in its meaning the difference between the first outer diameter of the trunk portion of the mold pin and the second outer diameter of the tip portion of the mold pin being small.

If the difference between the first outer diameter and the second outer diameter of the end mold pin having a center axis that forms a large angle with the movement axis of the sector mold is great, when the end mold pin is removed from the insertion hole, the stress acting upon the rubber in a region around the insertion hole is great. As a result, cracking is highly likely to occur in a region around the insertion hole.

By the first outer diameter of the trunk portion of the end mold pin being great and the difference between the first outer diameter of the trunk portion of the end mold pin and the second outer diameter of the tip portion of the end mold pin being small, even when the end mold pin with a center axis that forms a large angle with the movement axis of the sector mold is removed from the insertion hole, the stress acting upon the rubber in a region around the insertion hole is suppressed. As a result, cracking in regions around the insertion holes formed by the end mold pins is suppressed.

The first outer diameter of the middle mold pin is small and the difference between the first outer diameter and the second outer diameter of the middle mold pin is greater, however the angle formed by the center axis of the middle mold pin and the movement axis of the sector mold is small. As a result, when the middle mold pin is removed from the insertion hole, the stress acting upon the rubber in a region around the insertion hole is suppressed. Accordingly, cracking in regions around the insertion holes formed by the middle mold pins is suppressed.

By suppressing cracking, a decrease in the holding force of the stud pins provided by the insertion holes and spoiling of the appearance of the studded tire, which are caused by such cracking, can be prevented. Thus, a decrease in the performance of the studded tire is prevented.

Additionally, according to the first aspect of the present technology, the mold pin comprising the trunk portion with the first outer diameter and the tip portion with the second outer diameter has a circular shape in a plane orthogonal to the center axis of the mold pin. Accordingly, in the installation of the mold pins into the sector molds, excessive attention does not need to be paid to the orientation of the mold pins with respect to the rotation direction about the center axis. Thus, complexity of the labor involved is suppressed. Additionally, cracking conditions changing due to the orientation of the mold pin is suppressed.

In the first aspect of the present technology, a difference between the first outer diameter of the end mold pin and the first outer diameter of the middle mold pin may be from 0.1 mm to 1.0 mm.

This suppresses crack and thus maintains the performance of the studded tire. If the difference is less than 0.1 mm, cracking in a region around the insertion hole formed by the end mold pin may not be sufficiently suppressed. If the difference is greater than 1.0 mm, the holding force of the stud pin provided by the insertion hole formed by the end mold pin is likely to decrease.

In the first aspect of the present technology, the second outer diameter of the tip portion of the end mold pin may be less than the second outer diameter of the tip portion of the middle mold pin.

This effectively suppresses crack and thus maintains the performance of the studded tire. The second outer diameter of the tip portion of the mold pin being great includes in its meaning the difference between the first outer diameter of the trunk portion of the mold pin and the second outer diameter of the tip portion of the mold pin being small. The second outer diameter of the tip portion of the mold pin being small includes in its meaning the difference between the first outer diameter of the trunk portion of the mold pin and the second outer diameter of the tip portion of the mold pin being large. By the second outer diameter of the tip portion of the end mold pin being small and the difference between the first outer diameter of the trunk portion of the end mold pin and the second outer diameter of the tip portion of the end mold pin being small, even when the end mold pin with a center axis that forms a large angle with the movement axis of the sector mold is removed from the insertion hole, the stress acting upon the rubber in a region around the insertion hole is suppressed. As a result, cracking in regions around the insertion holes formed by the end mold pins is suppressed.

In the first aspect of the present technology, a difference between the second outer diameter of the end mold pin and the second outer diameter of the middle mold pin may be from 0.2 mm to 1.5 mm.

This suppresses crack and thus maintains the performance of the studded tire. If the difference is less than 0.2 mm, cracking in a region around the insertion hole formed by the end mold pin may not be sufficiently suppressed. If the difference is greater than 1.5 mm, the holding force of the stud pin provided by the insertion hole formed by the end mold pin is likely to decrease.

In the first aspect of the present technology, a length of the end mold pin may be less than a length of the middle mold pin.

As a result, cracking is effectively suppressed. By the length of the end mold pin being small, even when the end mold pin with a center axis that forms a large angle with the movement axis of the sector mold is removed from the insertion hole, the stress acting upon the rubber in a region around the insertion hole is suppressed.

As a result, cracking in regions around the insertion holes formed by the end mold pins is suppressed.

In the first aspect of the present technology, a difference between the length of the end mold pin and the length of the middle mold pin may be from 0.1 mm to 1.0 mm.

This suppresses crack and thus maintains the performance of the studded tire. If the difference is less than 0.1 mm, cracking in a region around the insertion hole formed by the end mold pin may not be sufficiently suppressed. If the difference is greater than 1.0 mm, the holding force of the stud pin provided by the insertion hole formed by the end mold pin is likely to decrease.

In the first aspect of the present technology, the end mold pin may be a mold pin of the plurality of mold pins provided on each of the plurality of sector molds located closest to an end portion of the sector mold in the tire circumferential direction.

As a result, cracking in a region around the insertion hole formed by the end mold pin with a center axis that forms the greatest angle with the movement axis of the sector mold is suppressed.

In the first aspect of the present technology,
the tread portion may comprises a first region on one side of an equator line of the tire in a tire lateral direction and a second region on the other side,
the plurality of mold pins may comprise a plurality of mold pins for forming the insertion holes in the first region and a plurality of mold pins for forming the insertion holes in the second region, and
the end mold pin may be a mold pin of the plurality of mold pins for forming the insertion holes in the first region and the second region located closest to an end portion of each of the plurality of sector molds in the tire circumferential direction.

As a result, cracking in a region around the insertion holes formed in the first region and cracking in a region around the insertion holes formed in the second region are suppressed. Thus, the stud pins in the first region and the second region are prevented from falling out and a decrease in the running performance of the studded tire is suppressed.

In the first aspect of the present technology, the middle mold pin may be a mold pin of the plurality of mold pins provided on the plurality of sector molds other than the end mold pins, and the first outer diameter, the second outer diameter, and the length may be the same for all of the middle mold pins.

As a result, it is sufficient to prepare only two types of mold pins, the end mold pin and the middle mold pin, thus suppressing the cost of the tire mold.

A second aspect of the present technology provides a pneumatic tire, comprising:

a tread portion formed by a plurality of sector molds disposed in a tire circumferential direction;

a plurality of insertion holes into which stud pins are inserted, the plurality of insertion holes being formed in the tread portion by mold pins provided on inner surfaces of the plurality of sector molds that oppose the tread portion and projecting inward in a tire radial direction;

the stud pins each comprising a body portion and a bottom flange portion;

the plurality of insertion holes each comprising a first hole portion with a first inner diameter where the body portion of the stud pin is disposed and a second hole portion with a second inner diameter greater than the first inner diameter where the bottom flange portion of the stud pin is disposed; and the first inner diameter of the first hole portion of an end insertion hole of the plurality of insertion holes formed in an end region in the tire circumferential direction of a predetermined region, which is formed by one of the plurality of sector molds, of the tread portion being greater than the first inner diameter of the first hole portion of a middle insertion hole of the plurality of insertion holes formed in a middle region of the tread portion, the middle region being located between the end region on one side and the end region on the other side in the tire circumferential direction.

According to the second aspect of the present technology, the first inner diameter of the end insertion hole is greater than the first inner diameter of the middle insertion hole. As a result, when the sector molds are moved outward in the tire radial direction to release the tire and the mold pins are removed from the insertion holes formed in the tire, cracking caused by removal of the mold pins is suppressed. Thus, a decrease in the performance of the pneumatic tire is prevented.

Additionally, according to the second aspect of the present technology, the insertion hole comprising the first hole portion with the first inner diameter and the second hole portion with the second inner diameter has a circular shape in a plane orthogonal to the center axis of the insertion hole. Accordingly, in forming the insertion holes, excessive attention does not need to be paid to the orientation of the insertion holes with respect to the rotation direction about the center axis. Thus, complexity of the labor involved is suppressed. Additionally, cracking conditions changing due to the orientation of the insertion hole is suppressed.

In the second aspect of the present technology, a difference between the first inner diameter of the end insertion hole and the first inner diameter of the middle insertion hole may be from 0.1 mm to 1.0 mm.

This suppresses crack and thus maintains the performance of the studded tire. If the difference is less than 0.1 mm, cracking in a region around the end insertion hole may not be sufficiently suppressed. If the difference is greater than 1.0 mm, the holding force of the stud pin provided by the end insertion hole is likely to decrease.

In the second aspect of the present technology, the second inner diameter of the second hole portion of the end insertion hole may be less than the second inner diameter of the second hole portion of the middle insertion hole.

As a result, cracking is more effectively suppressed.

In the second aspect of the present technology, a difference between the second inner diameter of the end insertion hole and the second inner diameter of the middle insertion hole may be from 0.2 mm to 1.5 mm.

This suppresses crack and thus maintains the performance of the studded tire. If the difference is less than 0.2 mm, cracking in a region around the end insertion hole may not be sufficiently suppressed. If the difference is greater than 1.5 mm, the holding force of the stud pin provided by the end insertion hole is likely to decrease.

In the second aspect of the present technology, a length of the end insertion hole may be less than a length of the middle insertion hole.

As a result, cracking is effectively suppressed.

In the second aspect of the present technology, a difference between the length of the end insertion hole and the length of the middle insertion hole may be from 0.1 mm to 1.0 mm.

This suppresses crack and thus maintains the performance of the studded tire. If the difference is less than 0.1 mm, cracking in a region around the end insertion hole may not be sufficiently suppressed. If the difference is greater than 1.0 mm, the holding force of the stud pin provided by the end insertion hole is likely to decrease.

In the second aspect of the present technology, the end insertion hole may be an insertion hole of the plurality of insertion holes provided in the predetermined region located closest to an end portion of the predetermined region in the tire circumferential direction.

As a result, cracking in a region around the end insertion hole with a center axis that forms the greatest angle with the movement axis of the sector mold is suppressed.

In the second aspect of the present technology, the tread portion may comprise a first region on one side of a tire equator line in a tire lateral direction and a second region on the other side, the plurality of insertion holes may be formed in the first region and the second region, and the end insertion hole may be an insertion hole of the plurality of insertion holes formed in the first region located closest to an end portion of the predetermined region in the tire circumferential direction and may be an insertion hole of the plurality of insertion holes formed in the second region located closest to an end portion of the predetermined region in the tire circumferential direction.

As a result, cracking in a region around the insertion holes formed in the first region and cracking in a region around the insertion holes formed in the second region are suppressed. Thus, the stud pins in the first region and the second region are prevented from falling out and a decrease in the running performance of the studded tire is suppressed.

In the second aspect of the present technology, the middle insertion hole may be an insertion hole of the plurality of insertion holes provided in the tread portion other than the end mold pins, and the first inner diameter, the second inner diameter, and the length may be the same for all of the middle insertion holes.

As a result, it is sufficient to prepare only two types of insertion holes, the end insertion hole and the middle insertion hole, thus suppressing the cost of the pneumatic tire.

An aspect of the present technology provides a tire mold and a pneumatic tire capable of suppressing cracking in a region around insertion holes.

BRIEF DESCRIPTION OF DRAWINGS

FIG. 12 is a table showing results of evaluation tests for the conventional example and examples.

DETAILED DESCRIPTION

Embodiments according to the present technology will be described with reference to the appended drawings. However, the present technology is not limited to these embodiments. Constituents of the embodiments described below can be combined with one another as appropriate. In addition, some of the constituents may not be used in some cases.

First Embodiment

Figure 1:
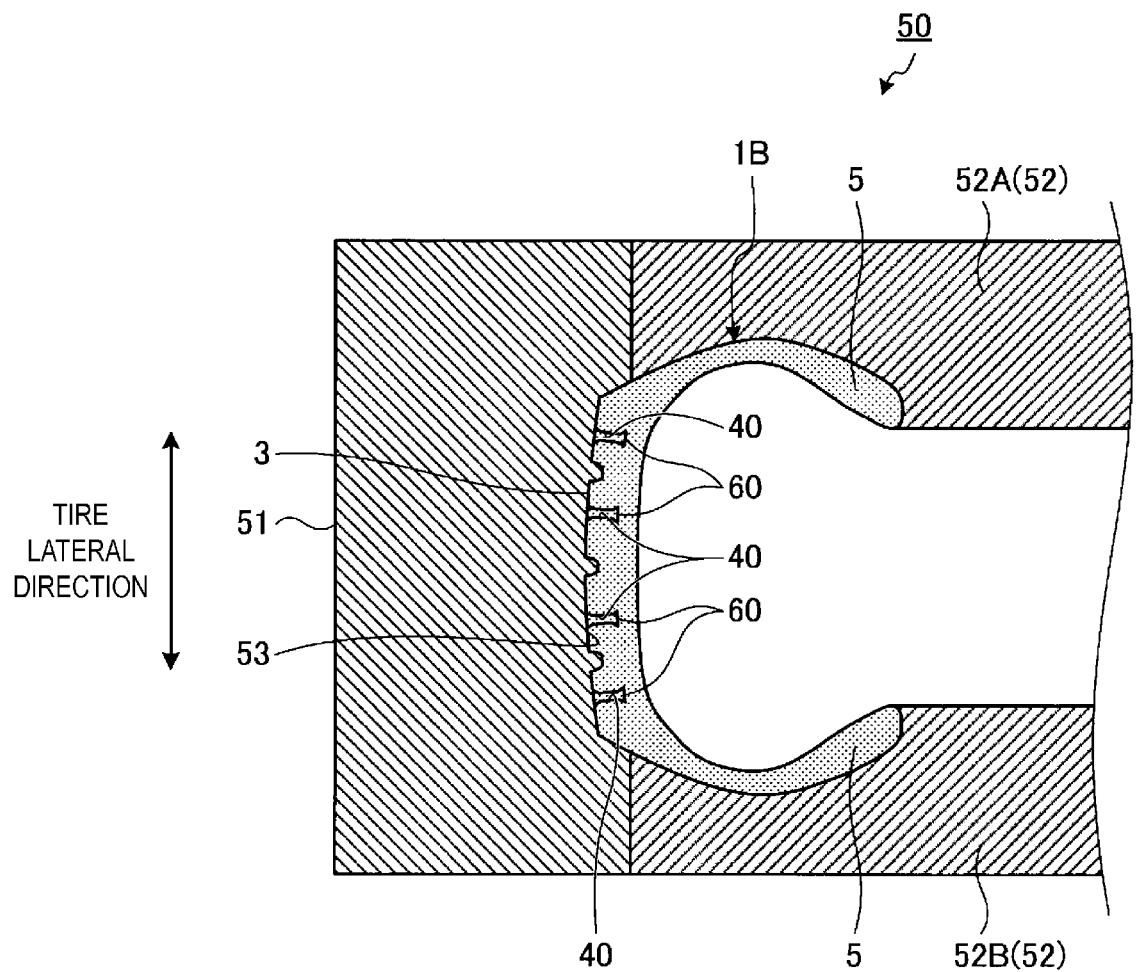
FIG. 1 is a cross-sectional view schematically illustrating a portion of a mold according to a first embodiment.
Figure 2:
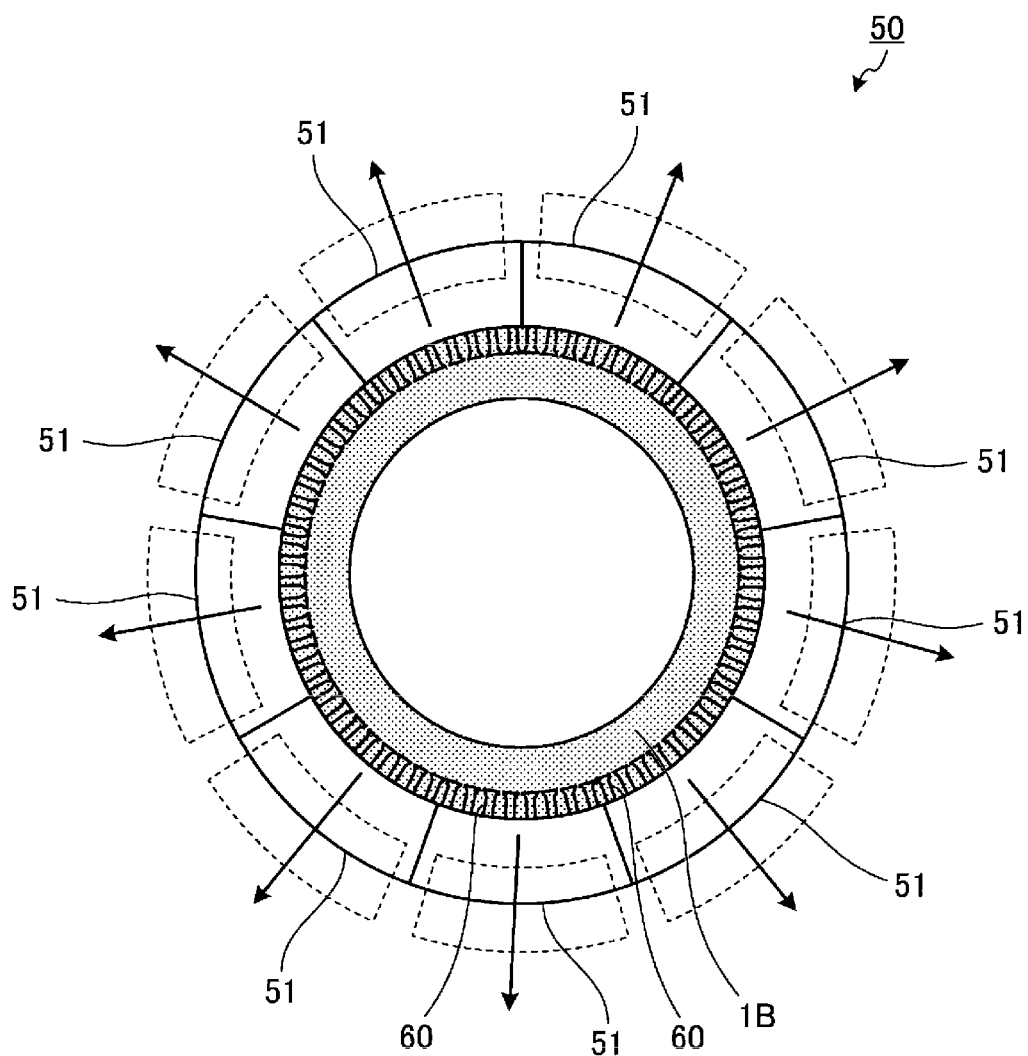
FIG. 2 is a diagram schematically illustrating an example of the operation of the mold according to the first embodiment.

A first embodiment will now be described. FIG. 1 is a cross-sectional view schematically illustrating a portion of a tire mold 50 according to the present embodiment. FIG. 2 is a diagram schematically illustrating an example of the operation of the mold 50 according to the present embodiment.

The mold 50 forms a tire 1B that includes insertion holes 40 into which stud pins are inserted. The mold 50 is a vulcanization mold. A green tire is disposed inside the mold 50. The green tire is supported by the mold 50 when vulcanized.

The mold 50 includes a plurality of sector molds 51 for forming a tread portion 3 of the tire 1B disposed in the tire circumferential direction, and side molds 52 for forming sidewall portions 5 of the tire 1B.

Additionally, the mold 50 includes a plurality of mold pins 60 for forming the insertion holes 40 in the tread portion 3. The mold pins 60 are disposed on an inner surface 53 of each of the sector molds 51 that opposes the tread portion 3 of the tire 1B and project inward in the tire radial direction.

The tread portion 3 is formed by the plurality of sector molds 51 disposed in the tire circumferential direction. The plurality of insertion holes 40 into which the stud pins are inserted are formed in the tread portion 3 by the mold pins 60. The mold pins 60 are disposed on the inner surface 53 of each of the sector molds 51 that opposes the tread portion 3 and project inward in the tire radial direction.

Note that, although not illustrated, the sector molds 51 include a plurality of projection portions for forming grooves in the tread portion 3. A tread pattern is formed in the tire 1B by the projection portions provided on the inner surface 53 of each of the sector molds 51.

The side molds 52 include an upper side mold 52A and a lower side mold 52B. The tire 1B is disposed between the upper side mold 52A and the lower side mold 52B.

As illustrated in FIG. 2, the sector molds 51 are arranged in the tire circumferential direction. In the example illustrated in FIG. 2, the mold 50 includes nine sector molds 51.

The sector molds 51 are members of an annular mold divided in the tire circumferential direction. As illustrated by the arrow in FIG. 2, the sector molds 51 are moveable in the tire radial direction. The sector molds 51 are brought into contact with the tread portion 3 of the tire 1B by being moved inward in the tire radial direction. The sector molds 51 are released from the tread portion 3 of the tire 1B by being moved outward in the tire radial direction. The sector molds 51 move inward in the tire radial direction to form an integrated annular mold. The sector molds 51 move outward in the tire radial direction to become divided.

Note that FIG. 2 illustrates an example in which the annular mold is divided into nine sections, i.e. includes nine sector molds 51. The annular mold may be divided into eight sections, for example.

The upper side mold 52A is released from the sidewall portion 5 of the tire 1B by being moved upward. The upper side mold 52A is brought into contact with the sidewall portion 5 of the tire 1B by being moved downward. The lower side mold 52B is released from the sidewall portion 5 of the tire 1B by being moved downward. The lower side mold 52B is brought into contact with the sidewall portion 5 of the tire 1B by being moved upward.

Figure 3:
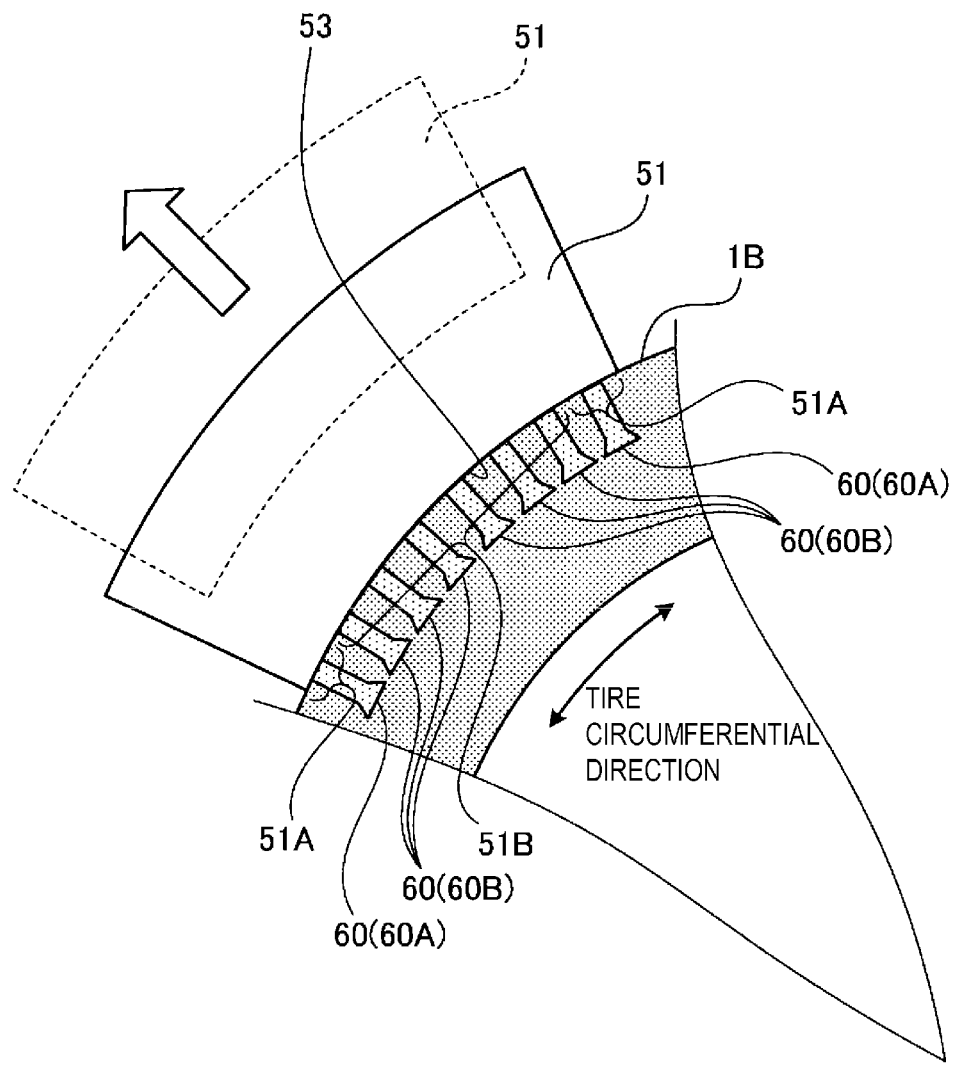
FIG. 3 is diagram schematically illustrating an example of a sector mold according to the first embodiment.

FIG. 3 is diagram schematically illustrating an example of a sector mold 51 according to the present embodiment. The sector mold 51 includes the mold pins 60 arranged in the tire circumferential direction. The mold pins 60 include end mold pins 60A and middle mold pins 60B. The end mold pins 60A are provided in end regions 51A of the inner surface 53 of the sector mold 51 with respect to the tire circumferential direction. The middle mold pins 60B are provided in a middle region 51B of the inner surface 53 of the sector mold 51 between the end regions 51A.

Each end region 51A is a region spanning in the tire circumferential direction from the end portion of the inner surface 53 of the sector mold 51 to a position located a predetermined distance from the end portion toward the center of the inner surface 53. The end regions 51A include the end region 51A that includes the end portion on one side of the inner surface 53 and the end region 51A that includes the end portion on the other side of the inner surface 53, with respect to the tire circumferential direction. The middle region 51B is the region of the inner surface 53 between the end region 51A on one side and the end region 51A on the other side.

In the present embodiment, the end mold pins 60A are the mold pins 60 provided on the sector mold 51 that are located closest to the end portions of the sector mold 51 with respect to the tire circumferential direction. In other words, among the mold pins 60 disposed in the tire circumferential direction, the mold pin 60 located closest to the end portion on one side of the inner surface 53 and the mold pin 60 located closest to the end portion on the other side of the inner surface 53 are end mold pins 60A. One sector mold 51 includes two end mold pins 60A.

The middle mold pins 60B are the mold pins 60 other than the end mold pins 60A provided on the sector mold 51. For example, in a configuration in which one sector mold 51 includes 32 mold pins 60, of the 32 mold pins 60, two are end mold pins 60A and 30 are middle mold pins 60B.

Figure 4:
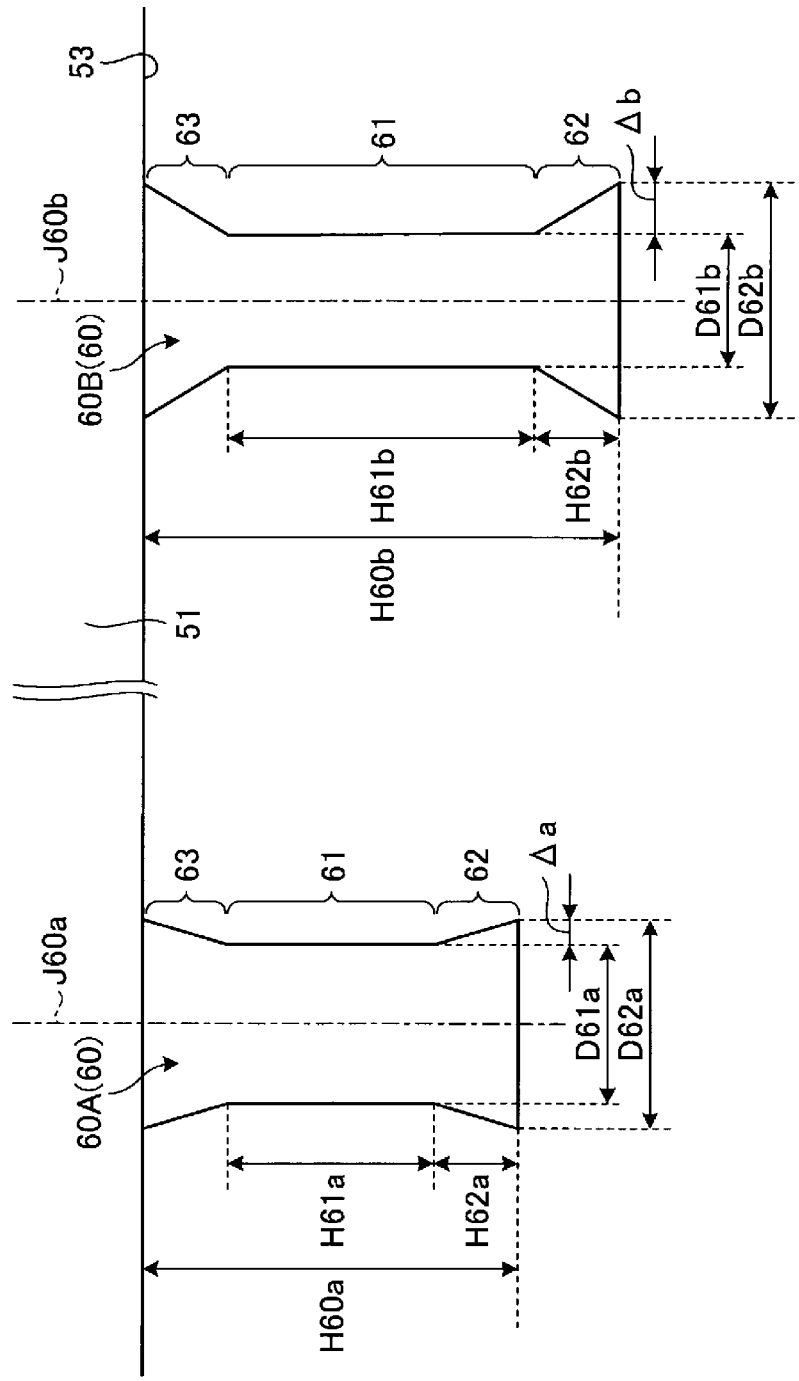
FIG. 4 is diagram schematically illustrating an example of a mold pin according to the first embodiment.

FIG. 4 is diagram schematically illustrating an example of the end mold pin 60A and the middle mold pin 60B according to the present embodiment. As illustrated in FIG. 4, the end mold pin 60A and the middle mold pin 60B both include a base portion 63 connected to the inner surface 53 of the sector mold 51, a trunk portion 61 connected to the base portion 63, and a tip portion 62 connected to the trunk portion 61.

The end mold pin 60A is disposed about a center axis J60a. In a plane orthogonal to the center axis J60a, the base portion 63, the trunk portion 61, and the tip portion 62 of the end mold pin 60A have a circular shape. The center axis J60a conforms with a radial axis from the center of the annular mold formed by the plurality of sector molds 51.

The middle mold pin 60B is disposed about a center axis J60b. In a plane orthogonal to the center axis J60b, the base portion 63, the trunk portion 61, and the tip portion 62 of the middle mold pin 60B have a circular shape. The center axis J60b conforms with a radial axis from the center of the annular mold formed by the plurality of sector molds 51.

The base portion 63 decreases in diameter as a distance from the the inner surface 53 increases. The trunk portion 61 has a cylindrical shape. The tip portion 62 increases in diameter as a distance from the from the inner surface 53 increases.

A first outer diameter $D61a$ that represents the dimensions of the trunk portion 61 of the end mold pin 60A in a plane orthogonal to the center axis $J60a$ is less than a second outer diameter D62a that represents the dimensions of the tip portion 62 of the end mold pin 60A. In other words, the second outer diameter D62a is greater than the first outer diameter D61a. A first outer diameter D61b that represents the dimensions of the trunk portion 61 of the middle mold pin 60B in a plane orthogonal to the center axis J60b is less than a second outer diameter D62b that represents the dimensions of the tip portion 62 of the middle mold pin 60B. In other words, the second outer diameter D62b is greater than the first outer diameter D61b.

A first length H61a that represents the dimensions of the trunk portion 61 of the end mold pin 60A in a plane parallel with the center axis J60a is greater than a second length H62a that represents the dimensions of the tip portion 62 of the end mold pin 60A. A first length H61b that represents the dimensions of the trunk portion 61 of the middle mold pin 60B in a plane parallel with the center axis J60b is greater than a second length H62b that represents the dimensions of the tip portion 62 of the middle mold pin 60B.

In the present embodiment, the first outer diameter D61a of the trunk portion 61 of the end mold pin 60A is greater than the first outer diameter D61b of the trunk portion 61 of the middle mold pin 60B. In other words, the trunk portion 61 of the end mold pin 60A is thicker than the trunk portion 61 of the middle mold pin 60B.

The difference between the first outer diameter D61a of the end mold pin 60A and the first outer diameter D61b of the middle mold pin 60B is from 0.1 mm to 1.0 mm.

The first outer diameter D61a of the end mold pin 60A is, for example, from 2.0 mm to 2.4 mm. The first outer diameter D61b of the middle mold pin 60B is from 0.1 mm to 1.0 mm less than the first outer diameter D61a.

Note that the difference between the first outer diameter D61a and the first outer diameter D61b is preferably from 0.2 mm to 0.5 mm.

In the present embodiment, the second outer diameter D62a of the tip portion 62 of the end mold pin 60A is less than the second outer diameter D62b of the tip portion 62 of the middle mold pin 60B. In other words, the tip portion 62 of the end mold pin 60A is thinner than the tip portion 62 of the middle mold pin 60B.

The difference between the second outer diameter D62a of the end mold pin 60A and the second outer diameter D62b of the middle mold pin 60B is from 0.2 mm to 1.5 mm.

The second outer diameter D62a of the end mold pin 60A is, for example, from 3.5 mm to 4.5 mm. The second outer diameter D62b of the middle mold pin 60B is from 0.2 mm to 1.5 mm less than the second outer diameter D62a.

Note that the difference between the second outer diameter D62a and the second outer diameter D62b preferably is from 0.5 mm to 1.0 mm.

The difference Δa between the first outer diameter D61a and the second outer diameter D62a of the end mold pin 60A is less than the difference Δb between the first outer diameter D61b and the second outer diameter D62b of the middle mold pin 60B.

In the present embodiment, a length H60a of the end mold pin 60A is less than a length H60b of the middle mold pin 60B. The length H60a is the distance in the tire radial direction, which is parallel with the center axis J60a, from the boundary portion between the inner surface 53 of the sector mold 51 and the end mold pin 60A to the tip portion 62 of the end mold pin 60A. The length H60b is the distance in the tire radial direction, which is parallel with the center axis J60b, from the boundary portion between the inner surface 53 of the sector mold 51 and the middle mold pin 60B to the tip portion 62 of the middle mold pin 60B.

The difference between the length H60a of the end mold pin 60A and the length H60b of the middle mold pin 60B is from 0.1 mm to 1.0 mm.

The length H60a of the end mold pin 60A is, for example, from 9.0 mm to 10.0 mm. The length H60b of the middle mold pin 60B is from 0.1 mm to 1.0 mm greater than the length H60a.

Note that the difference between the length H60a and the length H60b preferably is from 0.1 mm to 0.5 mm.

In the present embodiment, the first length H61a of the end mold pin 60A is less than the first length H61b of the middle mold pin 60B. The second length H62a of the end mold pin 60A may be equal to the second length H62b of the middle mold pin 60B or may be less than the second length H62b.

In the present embodiment, the first outer diameter D61b, the second outer diameter D62b, and the length H60b are the same for the plurality of middle mold pins 60B (for example, 30).

Next, an example of a method of manufacturing a studded tire 1 using a mold 50 according to the present embodiment is described.

First, the mold 50 including the sector molds 51 and the side molds 52 is prepared. The step of preparing the sector molds 51 includes installing the mold pins 60, which includes the end mold pins 60A and the middle mold pins 60B, into the sector molds 51. In the present embodiment, the end mold pins 60A have a circular shape in a plane orthogonal to the center axis J60a, and the middle mold pins 60B have a circular shape in a plane orthogonal to the center axis J60b. Accordingly, in the installation of the mold pins 60 into the sector molds 51, excessive attention does not need to be paid to the orientation of the mold pins 60 with respect to the rotation direction about the center axis J60.

The mold 50 is formed by assembling the sector molds 51 and the side molds 52 together. Adjacent sector molds 51 are brought in contact with each other.

A green tire is disposed inside the mold 50. The sector molds 51 are brought in contact with the tread portion 3 of the green tire. The side molds 52 are brought in contact with the sidewall portions 5 of the green tire. The insertion holes 40 are formed in the tread portion 3 by the sector molds 51 that include the mold pins 60. The green tire disposed inside the mold 50 is vulcanized by being subjected to high heat and pressure. The vulcanization forms the tire 1B that includes the tread portion 3 in which the insertion holes 40 are formed.

After vulcanization molding, the vulcanized tire 1B is removed from the mold 50. The step of removing the tire 1B from the mold 50 includes releasing the tire 1B by moving the sector molds 51 that are in contact with the tire 1B outward in the tire radial direction.

Figure 5:
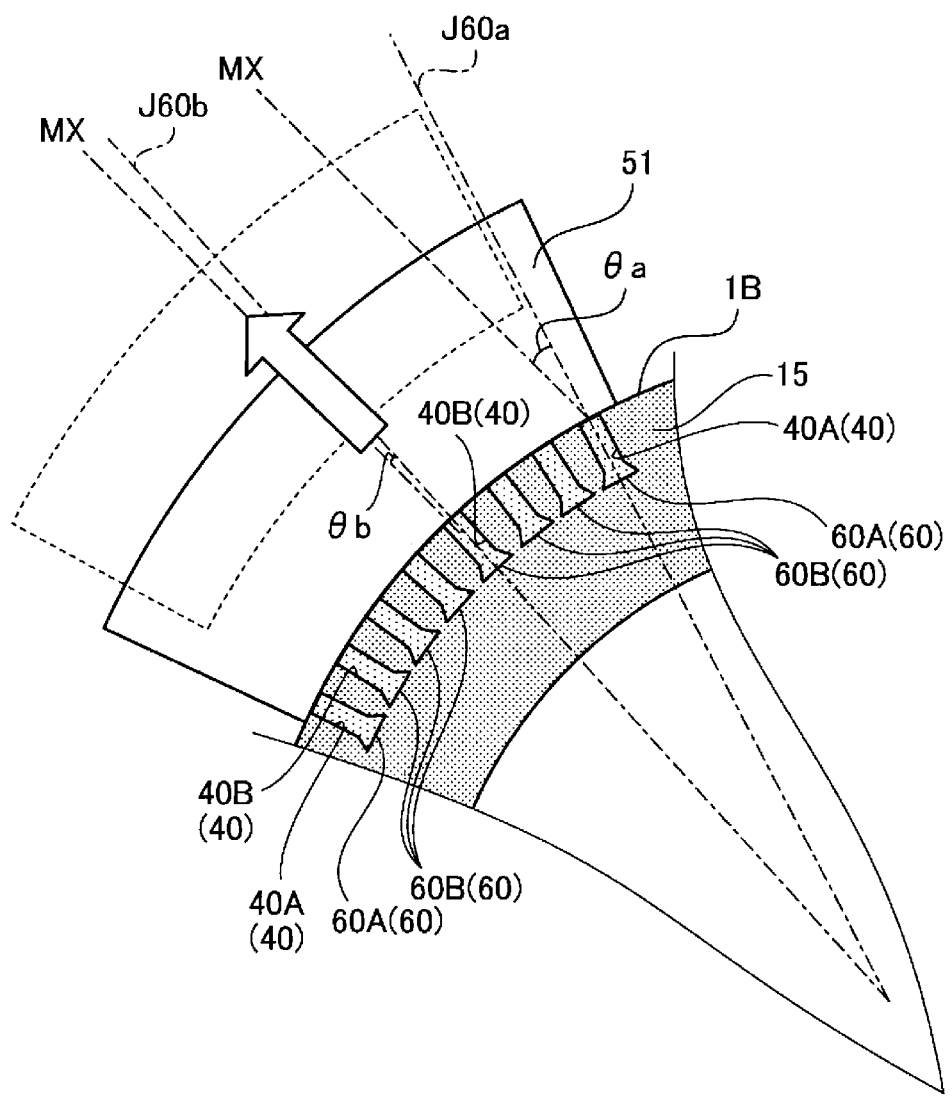
FIG. 5 is diagram schematically illustrating an example of the operation of the sector mold according to the first embodiment.

FIG. 5 is a diagram schematically illustrating how the mold pins 60 are removed from the insertion holes 40. As illustrated in FIG. 5, the sector molds 51 are moved outward in the tire radial direction to separate from the tire 1B, causing the mold pins 60 to be removed from the insertion holes 40 formed in the tread portion 3 of the tire 1B.

The sector molds 51 move along a movement axis MX parallel with the radiation direction from the center axis of the tire 1B (the center axis of the annular mold). An angle θb between the movement axis MX of the sector mold 51 and the center axis J60b of the middle mold pin 60B is less than an angle θa between the movement axis MX of the sector mold 51 and the center axis J60a of the end mold pin 60A.

In the present embodiment, the first outer diameter D61a of the trunk portion 61 of the end mold pin 60A is greater than the first outer diameter D61b of the trunk portion 61 of the middle mold pin 60B. The difference Δa between the first outer diameter D61a of the trunk portion 61 and the second outer diameter D62a of the tip portion 62 of the end mold pin 60A is less than the difference Δb between the first outer diameter D61b of the trunk portion 61 and the second outer diameter D62b of the tip portion 62 of the middle mold pin 60B.

Thus, even when the end mold pin 60A with the center axis J60a that forms a large angle θa with the movement axis MX is removed from the insertion hole 40, the stress acting upon a tread rubber 15 in a region around the insertion hole 40 is suppressed. Accordingly, cracking in regions around the insertion holes 40 formed by the end mold pins 60A is suppressed.

The first outer diameter D61b of the middle mold pin 60B is less than the first outer diameter D61a of the end mold pin 60A. The difference Δb between the first outer diameter D61b and the second outer diameter D62b of the middle mold pin 60B is greater than the difference Δa between the first outer diameter D61a and the second outer diameter D62a of the end mold pin 60A. The angle θb between the center axis J60b of the middle mold pin 60B and the movement axis MX of the sector mold 51 is less than the angle θa between the center axis J60a of the end mold pin 60A and the movement axis MX of the sector mold 51. Thus, when the middle mold pin 60B is removed from the insertion hole 40, the stress acting upon the tread rubber 15 in a region around the insertion hole 40 is suppressed. Accordingly, cracking in regions around the insertion holes 40 formed by the middle mold pins 60B is suppressed.

Figure 6:
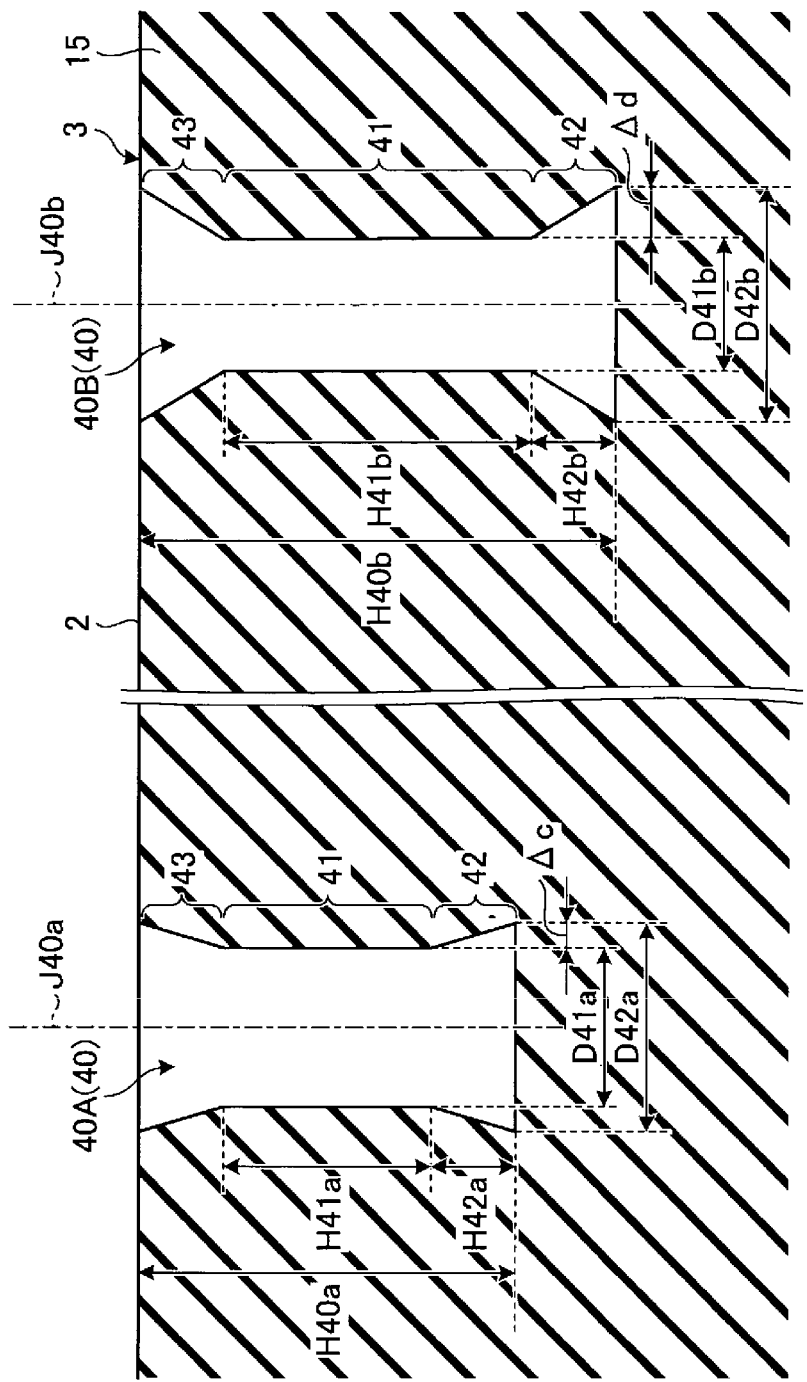
FIG. 6 is a cross-sectional view schematically illustrating an example of the insertion holes according to the first embodiment.

FIG. 6 is a cross-sectional view schematically illustrating an example of the insertion holes 40 according to the present embodiment. The insertion holes 40 are formed by the mold pins 60. The insertion holes 40 include end insertion holes 40A formed by the end mold pins 60A and middle insertion holes 40B formed by the middle mold pins 60B.

As illustrated in FIG. 6, the end insertion hole 40A and the middle insertion hole 40B both include a first hole portion 41 formed by the trunk portion 61 of the mold pin 60, a second hole portion 42 formed by the tip portion 62, and a third hole portion 43 formed by the base portion 63. The trunk portion 61 forms the first hole portion 41. The tip portion 62 forms the second hole portion 42.

The end insertion hole 40A is disposed about a center axis J40a. In a plane orthogonal to the center axis J40a, the first hole portion 41, the second hole portion 42, and the third hole portion 43 of the end insertion hole 40A have a circular shape. The center axis J40a conforms with a radial axis from the center of the tire 1B.

The middle insertion hole 40B is disposed about a center axis J40b. In a plane orthogonal to the center axis J40b, the first hole portion 41, the second hole portion 42, and the third hole portion 43 of the middle insertion hole 40B have a circular shape. The center axis J40b conforms with a radial axis from the center of the tire 1B.

The third hole portion 43 decreases in diameter as away from a contact patch 2 of the tread portion 3. The first hole portion 41 has a cylindrical shape. The second hole portion 42 increases in diameter as away from the contact patch 2.

A first inner diameter D41a that represents the dimensions of the first hole portion 41 of the end insertion hole 40A in a plane orthogonal to the center axis J40a is less than a second inner diameter D42a that represents the dimensions of the second hole portion 42 of the end insertion hole 40A.

In other words, the second inner diameter D42a is greater than the first inner diameter D41a. A first inner diameter D41b that represents the dimensions of the first hole portion 41 of the middle insertion hole 40B in a plane orthogonal to the center axis J40b is less than a second inner diameter D42b that represents the dimensions of the second hole portion 42 of the middle insertion hole 40B. In other words, the second inner diameter D42b is greater than the first inner diameter D41b.

A first length H41a that represents the dimensions of the first hole portion 41 of the end insertion hole 40A in a plane parallel with the center axis J40a is greater than a second length H42a that represents the dimensions of the second hole portion 42 of the end insertion hole 40A. A first length H41b that represents the dimensions of the first hole portion 41 of the middle insertion hole 40B in a plane parallel with the center axis J40b is greater than a second length H42b that represents the dimensions of the second hole portion 42 of the middle insertion hole 40B.

In the present embodiment, the first inner diameter D41a of the first hole portion 41 of the end insertion hole 40A is greater than the first inner diameter D41b of the first hole portion 41 of the middle insertion hole 40B. In other words, the first hole portion 41 of the end insertion hole 40A is larger than the first hole portion 41 of the middle insertion hole 40B.

The difference between the first inner diameter D41a of the end insertion hole 40A and the first inner diameter D41b of the middle insertion hole 40B is from 0.1 mm to 1.0 mm.

Note that the difference between the first inner diameter D41a and the first inner diameter D41b preferably is from 0.2 mm to 0.5 mm.

In the present embodiment, the second inner diameter D42a of the second hole portion 42 of the end insertion hole 40A is less than the second inner diameter D42b of the second hole portion 42 of the middle insertion hole 40B. In other words, the second hole portion 42 of the end insertion hole 40A is thinner than the second hole portion 42 of the middle insertion hole 40B.

The difference between the second inner diameter D42a of the end insertion hole 40A and the second inner diameter D42b of the middle insertion hole 40B is from 0.2 mm to 1.5 mm.

Note that the difference between the second inner diameter D42a and the second inner diameter D42b preferably is from 0.5 mm to 1.0 mm.

A difference Δc between the first inner diameter D41a and the second inner diameter D42a of the end insertion hole 40A is less than a difference Δd between the first inner diameter D41b and the second inner diameter D42b of the middle insertion hole 40B.

In the present embodiment, a length H40a of the end insertion hole 40A is less than a length H40b of the middle insertion hole 40B. The length H40a is the distance in the tire radial direction, which is parallel with the center axis J40a, from the contact patch 2 to the bottom surface of the second hole portion 42 of the end insertion hole 40A. The length H40b is the distance in the tire radial direction, which is parallel with the center axis J40b, from the contact patch 2 to the bottom surface of the second hole portion 42 of the middle insertion hole 40B.

The difference between the length H40a of the end insertion hole 40A and the length H40b of the middle insertion hole 40B is from 0.1 mm to 1.0 mm.

Note that the difference between the length H40a and the length H40b preferably is from 0.1 mm to 0.5 mm.

In the present embodiment, the first length H41a of the end insertion hole 40A is less than the first length H41b of the middle insertion hole 40B. The second length H42a of the end insertion hole 40A may be equal to the second length H42b of the middle insertion hole 40B or may be less than the second length H42b.

Figure 7:
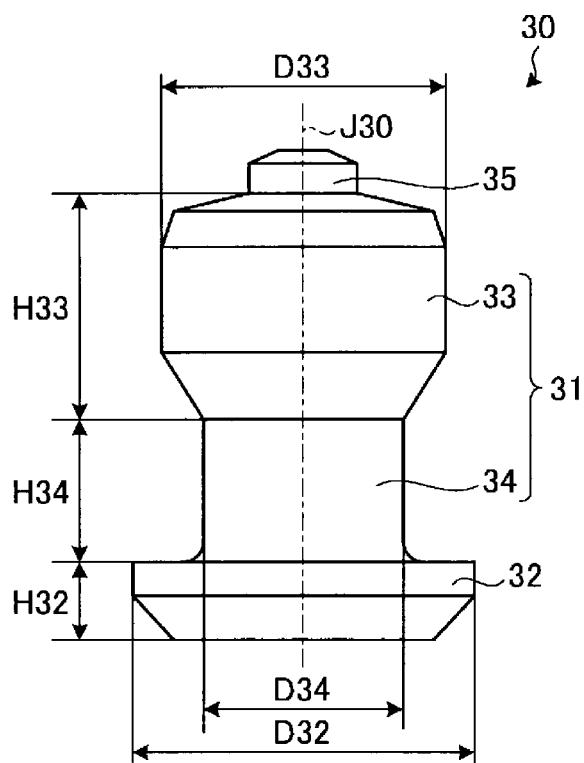
FIG. 7 is a side view illustrating an example of a stud pin according to the first embodiment.
Figure 8:
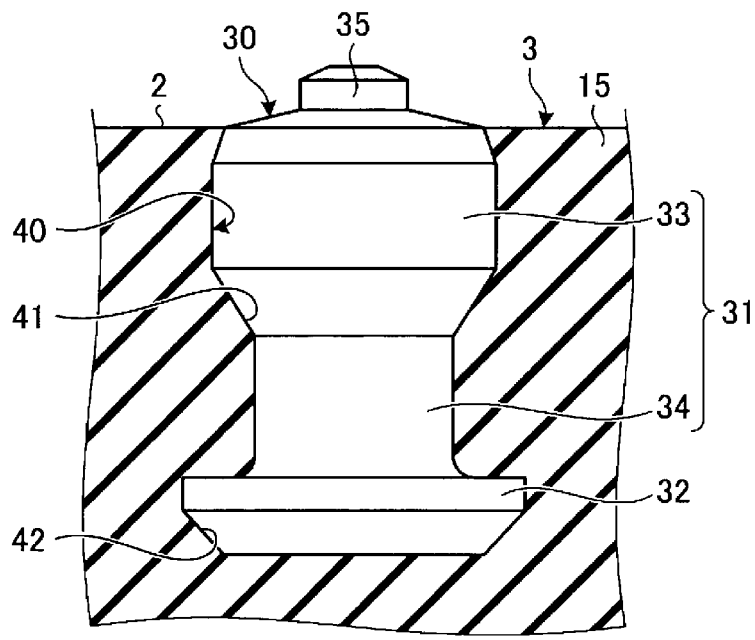
FIG. 8 is a side view illustrating an example of the stud pin and the insertion hole according to the first embodiment.

FIG. 7 is a side view illustrating an example of a stud pin 30 according to the present embodiment. FIG. 8 is a cross-sectional view illustrating an example of the stud pin 30 inserted into the insertion hole 40.

As illustrated in FIGS. 7 and 8, the stud pin 30 includes a body portion 31, a bottom flange portion 32, and a tip portion 35. The body portion 31 is supported by the bottom flange portion 32. The tip portion 35 is supported by the body portion 31. The bottom flange portion 32 and the body portion 31 are disposed in the insertion hole 40 provided in the tread portion 3. The tip portion 35 is disposed in a manner so as to project from the contact patch 2 of the tread portion 3.

In the present embodiment, the body portion 31 includes an upper flange portion 33 and a middle portion 34. The body portion 31 and the bottom flange portion 32 are integrated (one member).

The stud pin 30 is disposed is a region around a center axis J30 that passes through the tip portion 35. In a plane orthogonal to the center axis J30, the body portion 31, the bottom flange portion 32, and the tip portion 35 have a circular shape. In other words, in the present embodiment, the stud pin 30 is a circular pin. The bottom flange portion 32 and the upper flange portion 33 are circular flanges. The middle portion 34 has a cylindrical shape.

An outer diameter D34 that represents the dimensions of the middle portion 34 in a plane orthogonal to the center axis J30 is less than an outer diameter D33 of the upper flange portion 33. The outer diameter D34 of the middle portion 34 is less than an outer diameter D32 of the bottom flange portion 32. The outer diameter D33 of the upper flange portion 33 is less than the outer diameter D32 of the bottom flange portion 32.

A height H34 that represents the dimensions of the middle portion 34 in a plane parallel with the center axis J30 is less than a height H33 of the upper flange portion 33. The height H34 of the middle portion 34 is greater than a height H32 of the bottom flange portion 32. The height H33 of the upper flange portion 33 is greater than the height H32 of the bottom flange portion 32.

As illustrated in FIG. 8, the body portion 31 of the stud pin 30 is disposed in the first hole portion 41 of the insertion hole 40. The bottom flange portion 32 of the stud pin 30 is disposed in the second hole portion 42 of the insertion hole 40.

Figure 9:
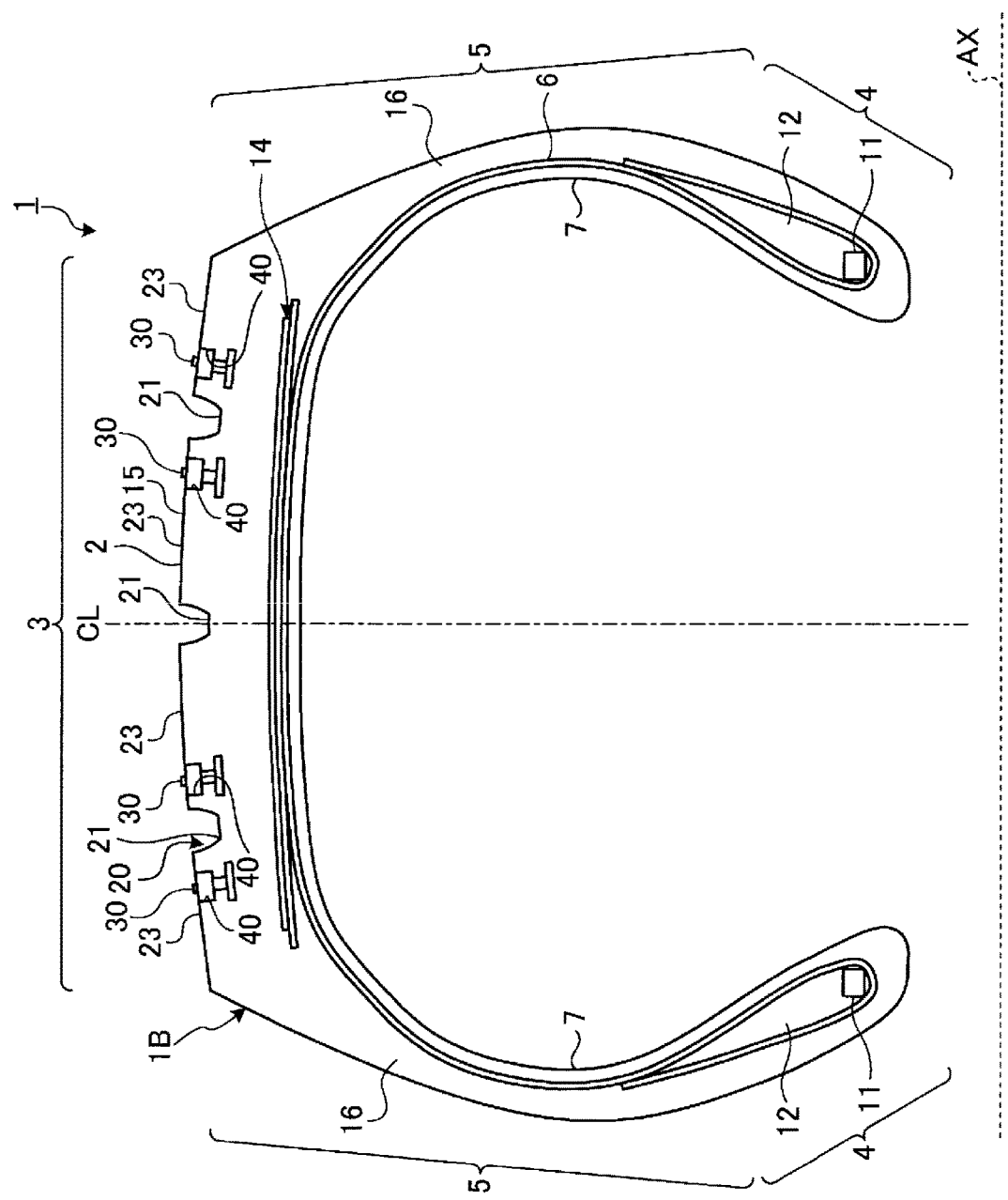
FIG. 9 is a cross-sectional view illustrating an example of a studded tire according to the first embodiment.
Figure 10:
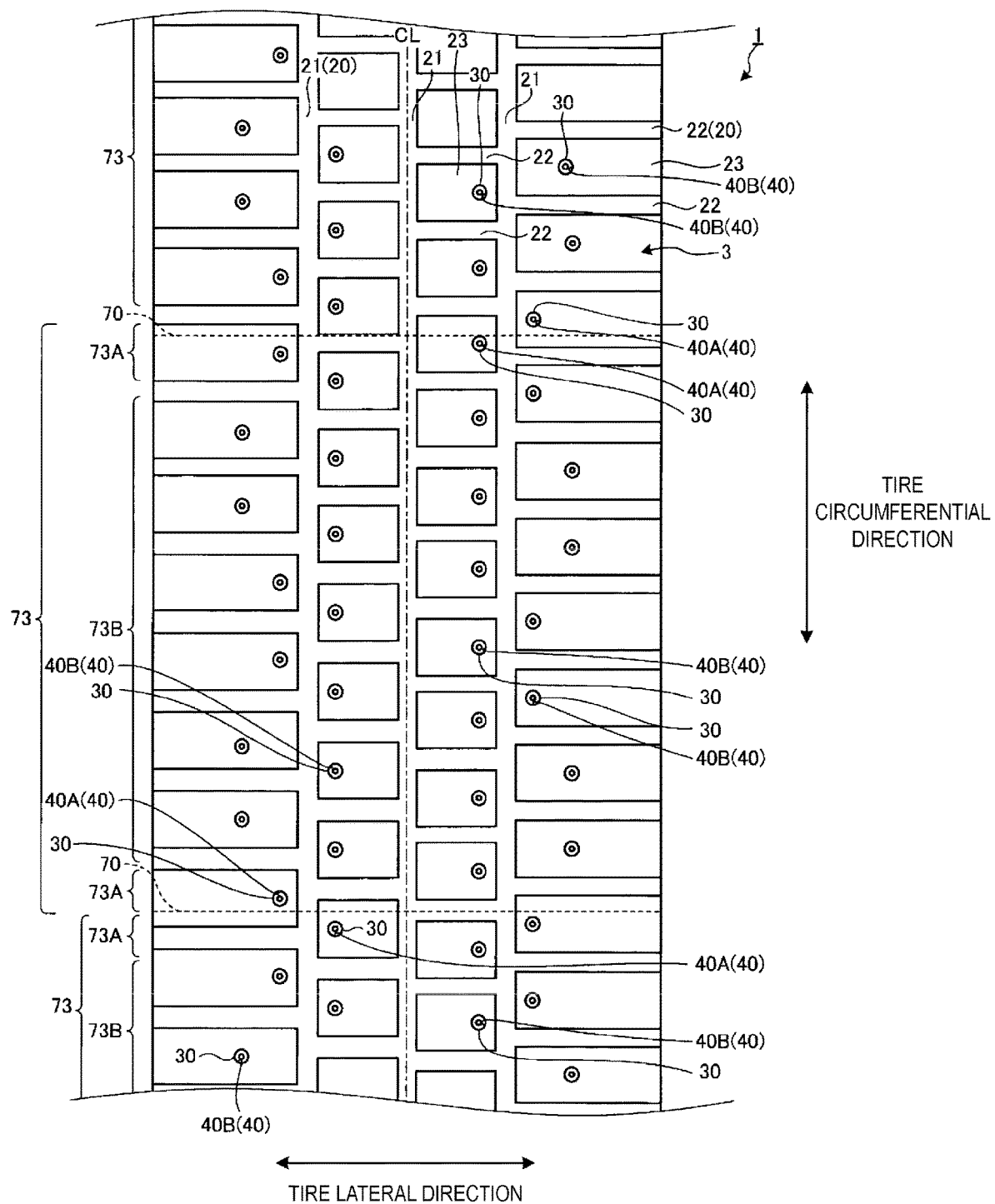
FIG. 10 is a plan view illustrating an example of the studded tire according to the first embodiment.

FIG. 9 is a cross-sectional view illustrating a portion of the studded tire 1 according to the present embodiment. FIG. 9 illustrates a meridian cross-section passing through a rotation axis AX of the studded tire 1. FIG. 10 is a plan view illustrating an example of the tread portion 3 of the studded tire 1 according to the present embodiment.

The studded tire 1 rotates about the rotation axis AX. The tire circumferential direction includes the tire rotation direction about the rotation axis AX. The tire lateral direction includes the direction parallel with the rotation axis AX. The tire radial direction includes the radiation direction from the rotation axis AX. An equator line CL of the studded tire 1 is the center line which passes through the center of the studded tire 1 in the tire lateral direction.

The studded tire 1 is a winter tire (snow tire) provided with the stud pins 30. The studded tire 1 may also be referred to as a spike tire 1.

The studded tire 1 includes the tire 1B and the stud pins 30 provided in the tread portion 3 of the tire 1B. The tire 1B is a pneumatic tire. The stud pins 30 are inserted into the insertion holes 40 formed in the tread portion 3.

As illustrated in FIG. 9, the tire 1B includes the contact patch 2, the tread portion 3 formed by the plurality of sector molds 51 disposed in the tire circumferential direction, and the plurality of insertion holes 40 formed in the tread portion 3 by the mold pins 60 disposed on the inner surface 53 of each of the sector molds 51 that opposes the tread portion 3 and project inward in the tire radial direction. The stud pins 30 are inserted into the insertion holes 40.

Additionally, the tire 1B includes bead portions 4 that connect to the rim and sidewall portions 5 that join the tread portion 3 and the bead portions 4. The contact patch 2 comes into contact with the road surface (ground) when the tire 1 runs.

The tire 1B includes a carcass 6 and an innerliner 7. The carcass 6 is the framework of the tire 1B and maintains the shape of the tire 1B. The innerliner 7 is disposed facing the cavity of the tire 1B. The carcass 6 and the innerliner 7 are disposed in the tread portion 3, the bead portions 4, and the sidewall portions 5.

The bead portions 4 each include a bead core 11 and a bead filler 12. The bead cores 11 fix the tire 1 to the rim. The bead cores 11 are disposed on either side of the equator line CL of the tire 1B in the tire lateral direction. The bead cores 11 include a plurality of high-carbon steel annular members bundled together. The bead cores 11 are disposed so as to surround the rotation axis AX. The bead fillers 12 increase the rigidity of the bead portions 4.

The tread portion 3 includes a belt 14 and the tread rubber 15. The belt 14 includes a layer of belt members. The belt 14 is disposed on the outer side of the carcass 6 in the tire radial direction. The belt 14 secures the carcass 6 and increases the rigidity of the tread portion 3. A tread pattern is formed in the tread rubber 15. The tread rubber 15 is disposed on the outer side of the carcass 6 and the belt 14 in the radial direction. The contact patch 2 is disposed in the tread rubber 15.

The sidewall portions 5 each include a sidewall rubber 16. The sidewall portions 5 are disposed on either side of the equator line CL in the tire lateral direction.

The carcass 6 is disposed in a toroidal form between the bead cores 11 on either side of the equator line CL in the tire lateral direction. The carcass 6 is folded back at both end portions so as to surround the bead fillers 12.

Grooves 20 are formed in the tread rubber 15. The tread pattern is formed by the grooves 20. The grooves 20 include main grooves 21 formed in the tire circumferential direction and lug grooves 22 formed in the tire lateral direction (see FIG. 10). The tread rubber 15 is defined by the main grooves 21 and the lug grooves 22, thus forming blocks 23. The contact patch 2 includes the surfaces of the blocks 23.

The studded tire 1 is provided with stud pins 30. The tire 1B includes a plurality of insertion holes 40 into which the stud pins 30 are inserted. The insertion holes 40 are formed in the tread portion 3 of the tire 1B. The insertion holes 40 are formed in the blocks 23 of the tread rubber 15. The stud pins 30 are at least partially disposed in the insertion holes 40. The stud pins 30 are supported by the inner surface of the insertion holes 40 so as to partially project from the contact patch 2 of the tread portion 3.

As illustrated in FIG. 10, the tread portion 3 includes a plurality of insertion holes 40 in the tire circumferential direction. The insertion holes 40 include the end insertion holes 40A provided in end regions 73A in the tire circumferential direction of a predetermined region 73 of the tread portion 3 formed by one sector mold 51, and the middle insertion holes 40B formed in a middle region 73B of the tread portion 3 between the end region 73A on one side and the end region 73A on the other side.

The predetermined region 73 is a region formed by the contact of one sector mold 51. A boundary portion 70 between two adjacent predetermined regions 73 opposes the boundary portion of two adjacent sector molds 51. The end portions of the predetermined regions 73 in the tire circumferential direction include the boundary portion 70.

A line (protrusion portion) can form in the tread portion 3 due to a gap between two adjacent sector molds 51. In the vulcanization, the rubber can enter the gap between two adjacent sector molds 51 and form a line. The boundary portion 70 may include such a line of rubber.

Each end region 73A is a region spanning in the tire circumferential direction from the end portion of the predetermined region 73 to a position located a predetermined distance from the end portion toward the center of the predetermined region 73. The end regions 73A include the end region 73A that includes the end portion on one side of the predetermined region 73 and the end region 73A that includes the end portion on the other side of the predetermined region 73, with respect to the tire circumferential direction. The middle region 73B is the region of the predetermined region 73 between the end region 73A on one side and the end region 73A on the other side.

In the present embodiment, the end insertion holes 40A are the insertion holes 40 provided in the predetermined region 73 of the tread portion 3 disposed closest to the end portions of the predetermined region 73 with respect to the tire circumferential direction. In other words, among the insertion holes 40 formed in the tire circumferential direction, the insertion hole 40 located closest to the end portion on one side of the predetermined region 73 and the insertion hole 40 located closest to the end portion on the other side of the predetermined region 73 are end insertion holes 40A. Two end insertion holes 40A are formed in one predetermined region 73.

The middle insertion holes 40B are the insertion holes 40 other than the end insertion holes 40A formed in the predetermined region 73 of the tread portion 3.

For example, in a configuration in which 32 insertion holes 40 are formed in one predetermined region 73, of the 32 insertion holes 40, two are end insertion holes 40A and 30 are middle insertion holes 40B.

In the present embodiment, the first inner diameter D41$b$, the second inner diameter D42$b$, and the length H40$b$ are the same for the plurality of middle insertion holes 40B (for example, 30).

As described above, according to the present embodiment, cracking in a region around the insertion holes 40 formed in the tread rubber 15 can be suppressed. As a result, a decrease in the holding force of the stud pins 30 provided by the insertion holes 40 and spoiling of the appearance of the studded tire 1, which are caused by such cracking, can be prevented. Thus, a decrease in the performance of the studded tire 1 is prevented.

In the present embodiment, the stud pins 30 include the body portion 31 and the bottom flange portion 32. Thus, the stud pins 30 are sufficiently prevented from falling out of the insertion holes 40.

Note that in the embodiment described above, the end mold pins 60A are defined as the mold pins 60 provided in the sector mold 51 that are located closest to the end portions of the sector mold 51 with respect to the tire circumferential direction. However, mold pins 60 provided on the inner surface 53 within a predetermined range (for example, 5 cm) from the end portion of the inner surface 53 may also be defined as end mold pins 60A. In such an embodiment, three or more end mold pins 60A can be provided in one sector mold 51.

Note that in the embodiment described above, the end insertion holes 40A are defined as the insertion holes 40 provided in the tread portion 3 disposed closest to the boundary portion 70 in the tire circumferential direction. However, insertion holes 40 formed within a predetermined range (for example, 5 cm) from the boundary portion 70 may also be defined as end insertion holes 40A. In such an embodiment, three or more end insertion holes 40A can be formed in one predetermined region 73.

Second Embodiment

A second embodiment will now be described. In the following descriptions, constituents identical to those in the above-described embodiments have the same reference signs, and descriptions thereof will be simplified or omitted.

Figure 11:
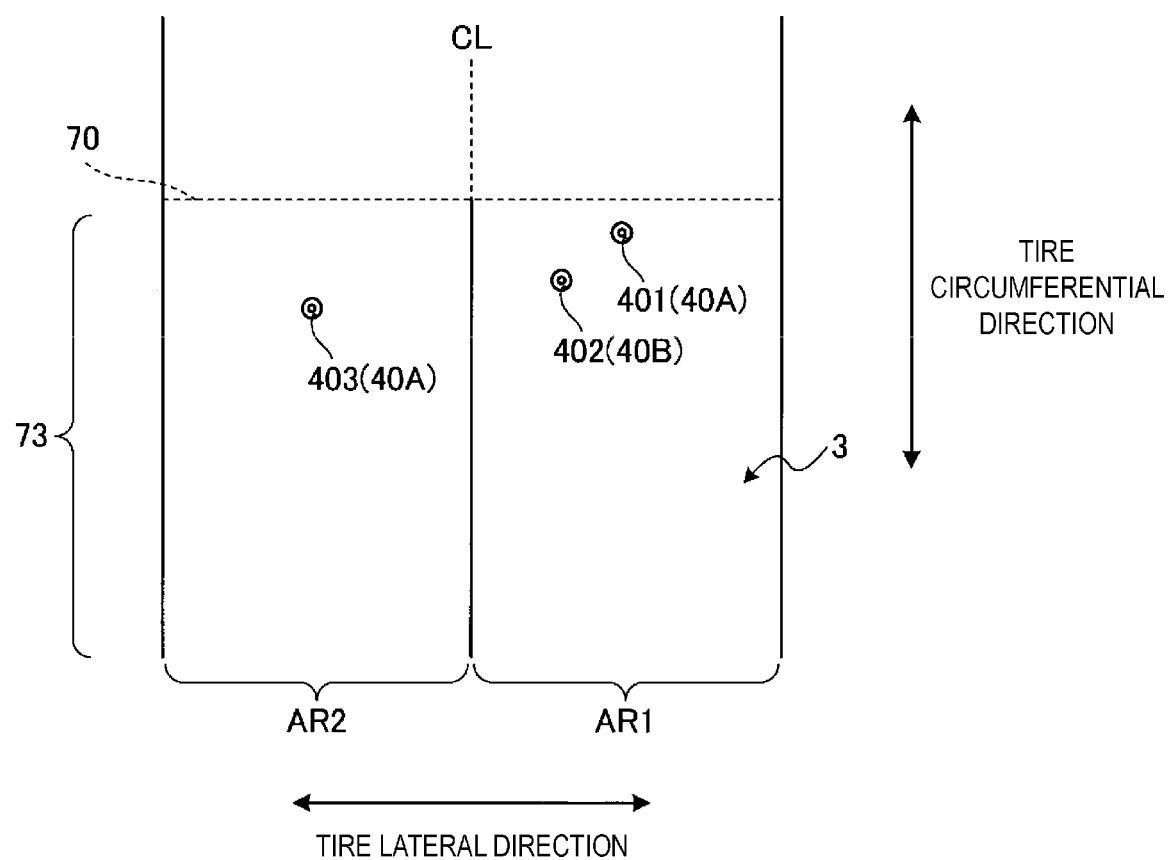
FIG. 11 is a diagram schematically illustrating an example of a tread portion of a studded tire according to a second embodiment.

FIG. 11 is a diagram schematically illustrating an example of the tread portion 3 according to the present embodiment. As illustrated in FIG. 11, the tread portion 3 includes a first region AR1 on one side of the equator line CL in the tire lateral direction and a second region AR2 on the other side. The insertion holes 40 are formed in the first region AR1 and the second region AR2.

The sector molds 51 include the mold pins 60 for forming the insertion holes 40 in the first region AR1 and the mold pins 60 for forming the insertion holes 40 in the second region AR2. The sector molds 51 form the insertion holes 40 illustrated in FIG. 11.

Of the insertion holes 40 formed in the first region AR1, the insertion hole 40 located closest to the boundary portion 70, which is the end portion of the predetermined region 73, in the tire circumferential direction may be defined as the end insertion hole 40A. Of the insertion holes 40 formed in the second region AR2, the insertion hole 40 located closest to the boundary portion 70, which is the end portion of the predetermined region 73, in the tire circumferential direction may be defined as the end insertion hole 40A.

In the example illustrated in FIG. 11, an insertion hole 401, an insertion hole 402, and an insertion hole 403 are formed in the predetermined region 73. The insertion hole 401 and the insertion hole 402 are formed in the first region AR1 of the predetermined region 73. The insertion hole 403 is formed in the second region AR2 of the predetermined region 73. The insertion hole 401 is located closest to the boundary portion 70, the insertion hole 402 is located closest to the boundary portion 70 after the insertion hole 401, and the insertion hole 403 is located farthest from the boundary portion 70.

In the first region AR1, the insertion hole 401 is located closest to the boundary portion 70 and is thus defined as an end insertion hole 40A. The insertion hole 403 is located further away from the boundary portion 70 than the insertion hole 402. However, the insertion hole 403 is located closest to the boundary portion 70 of the insertion holes 40 formed in the second region AR2. Accordingly, the insertion hole 403 is defined as an end insertion hole 40A. The insertion hole 402 is defined as a middle insertion hole 40B.

The insertion hole 401 (end insertion hole 40A) is formed by the mold pin 60 located closest to the end portion of the inner surface 53 of the sector mold 51 in the tire circumferential direction of the mold pins 60 for forming the insertion holes 40 in the first region AR1. The insertion hole 403 (end insertion hole 40A) is formed by the mold pin 60 located closest to the end portion of the inner surface 53 of the sector mold 51 in the tire circumferential direction of the mold pins 60 for forming the insertion holes 40 in the second region AR2.

As described above, in the present embodiment, the stud pins 30 are prevented from falling out from the first region AR1 and the second region AR2. Thus, a decrease in the running performance of the studded tire 1 is suppressed.

Note that in the first embodiment and the second embodiment, the mold pins 60 are classified into two types: the end mold pins 60A and the middle mold pins 60B. This configuration minimizes the types of mold pins 60 to allow the mold 50 to be easily manufactured, which suppresses an increase in the cost of the mold 50. Note that the sector molds 51 may be provided with three or more types of mold pins 60 with varying first outer diameters D61 of the trunk portion 61. In embodiments in which three or more mold pins 60 with varying first outer diameters D61 of the trunk portion 61 are disposed in the tire circumferential direction, a plurality of mold pins 60 may be provided with the first outer diameter D61 of the mold pins 60 gradually increasing from the central portion to the end portion of the inner surface 53.

Examples

FIG. 12 is a table showing results of evaluation tests for studded tires 1 according to the embodiments of the present technology. FIG. 12 shows results of evaluation tests which involved finding the number of insertion holes 40 around which cracking occurred (number of cracks) out of the insertion holes 40 formed in the studded tire 1.

Tires 1B with a tire size of 205/55R16 were vulcanization molded using the mold 50. Thereafter, the sector molds 51 of the mold 50 were moved to release the tire 1B. The number of cracks formed around the insertion holes 40 when the mold pins 60 were removed from the insertion holes 40 was counted. Note that 20 tires 1B were vulcanization molded. One hundred twenty insertion holes 40 were formed in each tire 1B. In each tire 1B, the number of insertion holes 40 disposed near the boundary portion 70 was 32. Thus, the total number of insertion holes 40 disposed near the boundary portion 70 was 640 (32×20).

Conventional example in FIG. 12 refers to an example in which the mold pins 60 provided on the sector molds 51 all have the same dimensions. Example 1, Example 2, and Example 3 are examples in which the mold pins 60 provided on the sector molds 51 include end mold pins 60A and middle mold pins 60B. In Example 1, the first outer diameter D61a of the end mold pins 60A is 0.3 mm greater than the first outer diameter D61b of the middle mold pins 60B. In Example 2, in addition to the conditions of Example 1, the second outer diameter D62a of the end mold pins 60A is 0.5 mm less than the second outer diameter D62b of the middle mold pins 60B. In Example 3, in addition to the conditions of Example 2, the length H60a of the end mold pins 60A is 0.2 mm less than the length H60b of the middle mold pins 60B.

As shown in FIG. 12, for the conventional example, cracking was found in a region around 30 insertion holes 40 out of the 640 insertion holes 40. For Example 1, cracking was found in a region around ten insertion holes 40 out of the 640 insertion holes 40. For Example 2, cracking was found in a region around seven insertion holes 40 out of the 640 insertion holes 40. For Example 3, cracking was found in a region around three insertion holes 40 out of the 640 insertion holes 40.

This shows that providing the sector molds 51 with the end mold pins 60A and the middle mold pins 60B can suppress cracking.

The invention claimed is:

1. A tire mold for forming a tire that includes insertion holes into which stud pins are inserted, the tire mold comprising:
   a plurality of sector molds for forming a tread portion of the tire, the plurality of sector molds being disposed in a tire circumferential direction; and
   a plurality of mold pins for forming the insertion holes in the tread portion, the plurality of mold pins being provided on inner surfaces of the plurality of sector molds that oppose the tread portion and projecting inward in a tire radial direction;
   the stud pins each comprising a body portion and a bottom flange portion;
   the insertion holes each comprising a first hole portion with a first inner diameter where the body portion of the stud pin is disposed and a second hole portion with a second inner diameter greater than the first inner diameter where the bottom flange portion of the stud pin is disposed;
   the plurality of mold pins each comprising a trunk portion with a first outer diameter for forming the first hole portion and a tip portion with a second outer diameter greater than the first outer diameter for forming the second hole portion; and
   the first outer diameter of the trunk portion of an end mold pin of the plurality of mold pins provided in an end region in the tire circumferential direction of each of the plurality of sector molds being greater than the first outer diameter of the trunk portion of a middle mold pin of the plurality of mold pins provided in a middle region of each of the plurality of sector molds, the middle region being located between the end region on one side and the end region on another side in the tire circumferential direction.

2. The tire mold according to claim 1, wherein a difference between the first outer diameter of the end mold pin and the first outer diameter of the middle mold pin is from 0.1 mm to 1.0 mm.

3. The tire mold according to claim 1, wherein the second outer diameter of the tip portion of the end mold pin is less than the second outer diameter of the tip portion of the middle mold pin.

4. The tire mold according to claim 3, wherein a difference between the second outer diameter of the end mold pin and the second outer diameter of the middle mold pin is from 0.2 mm to 1.5 mm.

5. The tire mold according to claim 1, wherein a length of the end mold pin is less than a length of the middle mold pin.

6. The tire mold according to claim 5, wherein a difference between the length of the end mold pin and the length of the middle mold pin is from 0.1 mm to 1.0 mm.

7. The tire mold according to claim 1, wherein the end mold pin is a mold pin of the plurality of mold pins provided on each of the plurality of sector molds located closest to an end portion of the sector mold in the tire circumferential direction.

8. The tire mold according to claim 1, wherein
the tread portion comprises a first region on one side of an equator line of the tire in a tire lateral direction and a second region on another side,
the plurality of mold pins comprise a plurality of mold pins for forming the insertion holes in the first region and a plurality of mold pins for forming the insertion holes in the second region, and
the end mold pin is a mold pin of the plurality of mold pins for forming the insertion holes in the first region and the second region located closest to an end portion of each of the plurality of sector molds in the tire circumferential direction.

9. The tire mold according to claim 1, wherein
the middle mold pin is a mold pin of the plurality of mold pins provided on the plurality of sector molds other than the end mold pins, and
the first outer diameter, the second outer diameter, and a length are the same for all of the middle mold pins.

* * * * *